United States Patent
Jiang et al.

(10) Patent No.: US 10,640,038 B2
(45) Date of Patent: May 5, 2020

(54) INTELLIGENT CAR REMINDING METHOD AND APPARATUS

(71) Applicant: HUAWEI TECHNOLOGIES CO., LTD., Shenzhen (CN)

(72) Inventors: Hongrui Jiang, Shenzhen (CN); Qiang Ding, Shenzhen (CN); Zheng Lin, Shenzhen (CN); Liyao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/300,578

(22) PCT Filed: May 11, 2016

(86) PCT No.: PCT/CN2016/081734
§ 371 (c)(1),
(2) Date: Nov. 11, 2018

(87) PCT Pub. No.: WO2017/193311
PCT Pub. Date: Nov. 16, 2017

(65) Prior Publication Data
US 2019/0283669 A1  Sep. 19, 2019

(51) Int. Cl.
*B60Q 9/00* (2006.01)
*B60Q 3/80* (2017.01)
*G08B 21/24* (2006.01)
*B60Q 1/50* (2006.01)

(52) U.S. Cl.
CPC .............. *B60Q 9/001* (2013.01); *B60Q 1/50* (2013.01); *B60Q 3/80* (2017.02); *G08B 21/24* (2013.01)

(58) Field of Classification Search
CPC .......... B60Q 9/001; B60Q 9/002; B60Q 3/80; B60Q 1/50; H04B 7/00
USPC .................................................. 340/457, 458
See application file for complete search history.

(56) References Cited

U.S. PATENT DOCUMENTS

| | | | |
|---|---|---|---|
| 5,086,938 A | 2/1992 | Aichinger | |
| 6,259,362 B1* | 7/2001 | Lin | B60Q 9/00 307/10.1 |
| 6,870,472 B2* | 3/2005 | Gift | B60N 2/002 180/273 |
| 8,368,522 B1 | 2/2013 | Kralj | |
| 9,715,816 B1* | 7/2017 | Adler | G06F 16/86 |
| 2005/0099275 A1* | 5/2005 | Kamdar | B60R 25/2009 340/426.18 |

(Continued)

FOREIGN PATENT DOCUMENTS

| | | |
|---|---|---|
| CN | 1037873 A | 12/1989 |
| CN | 201128393 Y | 10/2008 |

(Continued)

*Primary Examiner* — Emily C Terrell
(74) *Attorney, Agent, or Firm* — Kilpatrick Townsend & Stockton LLP

(57) ABSTRACT

This application relates to the field of intelligent hardware, and in particular, to an intelligent scenario in which a mobile terminal and a car are combined. After detecting, by using an acceleration sensor and a gyroscope of the mobile terminal, that a car engine stops, the mobile terminal receives, from a sensor installed near a roof lamp of the car, a signal indicating that the roof lamp is on, and determines that a door of the car is opened. In this case, the mobile terminal sends a reminder to a user.

18 Claims, 7 Drawing Sheets

(56) References Cited

U.S. PATENT DOCUMENTS

2013/0257604 A1* 10/2013 Mirle ...................... B60R 16/02
                                                        340/425.5

FOREIGN PATENT DOCUMENTS

| CN | 201525326 U | 7/2010 |
|----|-------------|--------|
| CN | 201613852 U | 10/2010 |
| CN | 201729120 U | 2/2011 |
| CN | 202686127 U | 1/2013 |
| CN | 103164877 A | 6/2013 |
| CN | 202966134 U | 6/2013 |
| CN | 104986104 A | 10/2015 |
| CN | 204870902 U | 12/2015 |
| CN | 105501178 A | 4/2016 |
| CN | 205149640 U | 4/2016 |
| CN | 205185982 U | 4/2016 |
| EP | 1207262 A2 | 5/2002 |
| EP | 1375267 A2 | 1/2004 |

\* cited by examiner

INTELLIGENT CAR REMINDING METHOD AND APPARATUS

CROSS-REFERENCE TO RELATED APPLICATIONS

This application is a National Stage of International Application No. PCT/CN2016/081734, filed on May 11, 2016, which is hereby incorporated by reference in its entirety.

TECHNICAL FIELD

Embodiments of the present invention relate to the field of intelligent hardware, and in particular, to an intelligent scenario in which a mobile terminal and a car are combined.

BACKGROUND

Car ownership is growing in today's society. Improvement of people's living standards requires a car to be intelligent. However, as a large durable product, the car is not frequently replaced. Except a small quantity of new cars, an existing huge quantity of cars may be modified to be intelligent with huge costs, and the modification may also cause invalidity of a manufacturer's warranty. In addition, development of modern science and technology also brings higher intelligent requirements. Especially because as a transportation means, the car often moves between different scenarios, an intelligent reminder function becomes even increasingly important for a user of the car.

Therefore, the existing huge quantity of cars require a convenient, easy, and low-cost modification scheme to become intelligent to implement intelligent reminding.

SUMMARY

In view of this, embodiments of the present invention provide an intelligent car reminding method and apparatus, so that an existing huge quantity of cars can become intelligent without costly modification, to improve car safety and use convenience.

According to one aspect, an embodiment of the present invention provides an intelligent car reminding method, including: detecting, by a mobile terminal, that a car engine stalls or a car stops; receiving, from a sensor, a signal indicating that a car lamp is on, where the car lamp is on when a door of the car is opened, and the sensor is configured to detect whether the car lamp is on; and sending, by the mobile terminal, a reminder to a user. In an implementation of this embodiment, a sensor and a voice/display function that are of an existing intelligent mobile terminal, such as a smartphone and a tablet, may be used to modify the car to be intelligent.

In a possible implementation, the car lamp may be a roof lamp. The roof lamp is disposed on an internal side of the top of the car, and configured to provide lighting for an interior of the car. In this implementation, a location of the roof lamp is fixed, space is sufficient, the sensor is easy to install, and emitted light is also relatively strong. This is beneficial to detection by the sensor.

In another possible implementation, the car lamp includes a dashboard indicator, a toolbox lamp, a car door lamp, or the like. Any lamp that is automatically on when a car door is opened may be detected by using the sensor, to detect whether the car door is opened.

In a possible implementation, the sensor may be disposed near all car lamps that may be on when the car door is opened. For example, when a different car door is opened, a different car lamp may be correspondingly on. This implementation can ensure that effective reminding can be implemented, regardless of which car door is opened.

In a possible implementation, the method further includes:

after the mobile terminal detects that the car stalls or the car stops, instructing, by the mobile terminal, the sensor to detect whether the car lamp is on. Keeping the sensor in a low-power standby state in a non-use time may prolong a standby time and reduce a quantity of misjudgments.

In a possible implementation, the mobile terminal receives the signal from the sensor in a wireless manner. Connecting, in the wireless manner, the sensor disposed in the car may facilitate the user's use, avoiding a wiring mess in the car.

In a possible implementation, the sensor may include a light sensor, an infrared temperature sensor, or an electromagnetic sensor.

In a possible implementation, the reminder sent by the mobile terminal to the user includes a voice reminder and/or a light reminder. Attracting the user's attention or directly sending content of the reminder to the user can implement intelligent reminding of the car.

In a possible implementation, the content of the reminder includes: reminding the user to pay attention to whether there is a pedestrian or an oncoming car behind when opening the door, to improve car safety.

In a possible implementation, the content of the reminder includes: reminding the user to take away an item that should be carried. This can avoid inconvenience that the user forgets the item in the car and a risk of the item being stolen.

Further, the content of the reminder may include: further pointing out to the user a name of the item that should be carried specifically. This makes it easy for the user to visually determine whether the reminded item is carried.

Still further, in a possible implementation, the mobile terminal has a maintainable item reminder list, to facilitate user maintenance. The user may set, according to an actual need, an item that the user needs to be reminded to carry.

In the foregoing possible implementation, the user may be reminded of the item reminder list by means of voice broadcasting or by displaying the item reminder list on a screen of the mobile terminal.

In a possible implementation, the mobile terminal determines the content of the reminder according to a positioning result of the mobile terminal, and the content of the reminder includes information related to the positioning result.

In a possible implementation, the content of the reminder includes weather conditions in a current area.

In a possible implementation, the content of the reminder includes a security situation in the current area.

In a possible implementation, the content of the reminder includes a consumption place and/or a recreation place in the current area.

In a possible implementation, the mobile terminal uses an acceleration sensor, uses the acceleration sensor to obtain, by using an energy detection method, values $Acc\_x$, $Acc\_y$, and $Acc\_z$ of an x-axis, a y-axis, and a z-axis of the acceleration sensor, and when energy of $Acc\_z$ in a unit time is less than a threshold $Wz$, determines that the car engine stalls; or when energy of $Acc\_x$ or $Acc\_y$ in a unit time is less than a threshold $Wx$ or $Wy$, determines that the car stops. When the engine stalls or stops, the user is likely to open the car door. In this case, the sensor is instructed to detect whether the car lamp is on.

In another possible implementation, the mobile terminal uses an acceleration sensor to obtain, by means of energy detection, a value Acc_z of the acceleration sensor on the z-axis, uses a gyroscope to detect angle change values of three axes of the gyroscope, and when energy of the value Acc_z of the acceleration sensor on the z-axis in a unit time is less than a threshold Wz, determines that the car engine stalls; or when all the angle change values, detected by the gyroscope, of the three axes in a unit time are less than a threshold, determines that the car stops.

According to another aspect, an embodiment of the present invention provides a mobile terminal. The mobile terminal has a function capable of implementing the foregoing intelligent reminding. The function may be implemented by hardware, or may be implemented by hardware executing corresponding software. The hardware or software includes one or more modules corresponding to the foregoing function. The modules may be hardware and/or software.

According to still another aspect, an embodiment of the present invention provides a system. The system includes a mobile terminal and a sensor. The mobile terminal and the sensor are connected in a wireless manner. The mobile terminal has a function capable of implementing the foregoing intelligent reminding. The function may be implemented by hardware, or may be implemented by hardware executing corresponding software. The hardware or software includes one or more modules corresponding to the foregoing function. The modules may be hardware and/or software.

In a possible implementation, the sensor may collect light of a car lamp in a pulse manner. That is, the sensor collects light intensity once every a period of time ΔT. Once detecting that a change ΔI of a light intensity value reaches a threshold, the sensor determines that the car door is opened, and sends a signal to the mobile terminal.

By using the foregoing solutions, in the embodiments of the present invention, the reminder can be sent to the user when the car door is opened after the car engine stalls or the car stops, thereby improving safety and facilitating the user's life.

DESCRIPTION OF EMBODIMENTS

Figure 1:
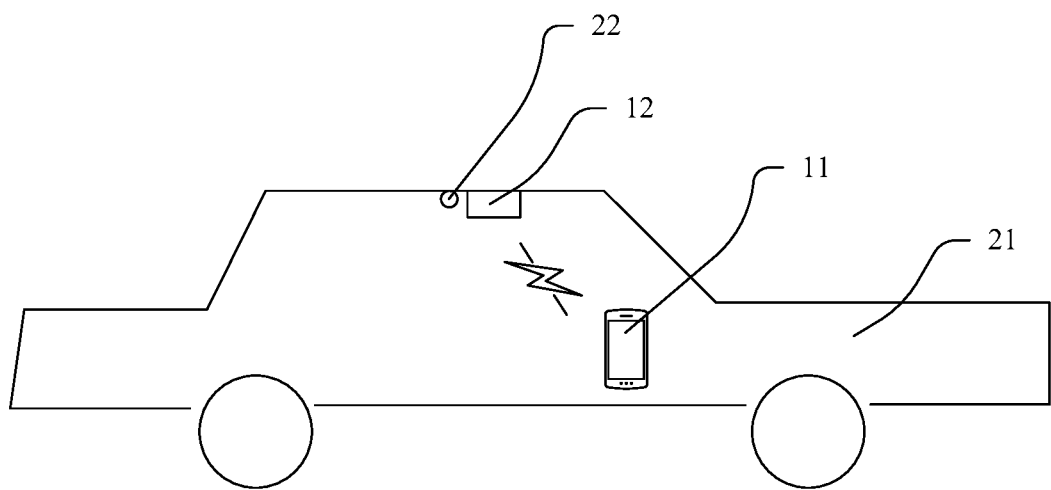
FIG. 1 is a schematic diagram of a reminding device according to a possible implementation of the present invention.

FIG. 1 is a schematic diagram of a reminding system according to a possible implementation of the present invention. As shown in FIG. 1, a car includes a car body 21 and a roof lamp 22. The roof lamp 22 is disposed at the top of a passenger compartment of the car body 21, and configured to provide lighting. When a door of the car is opened, the roof lamp 22 is on.

In a possible implementation, the roof lamp 22 may alternatively be disposed at another location on the car body 21, or is not configured for lighting, as long as the roof lamp 22 is on when the door of the car is opened.

The reminding device is disposed on the car. The reminding device may include a mobile terminal 11 and a sensor 12. The sensor 12 is disposed near the roof lamp 22 and configured to detect whether the car lamp 22 is on.

In a possible implementation, any lamp that is automatically on when a car door is opened may be detected by using the sensor 12, to detect whether the car door is opened. The lamp includes but is not limited to a dashboard indicator, a toolbox lamp, a car door lamp, or the like. For ease of description, the following uses only the roof lamp for description, not representing that the present invention is limited to this technical solution.

Further, in a possible implementation, a rear-facing door lamp is disposed on the door of the car. When the door of the car is opened, the door lamp is on, warning a pedestrian or a vehicle in the rear. The sensor 12 may be disposed near the door lamp to detect whether the door lamp is on. For example, for the rear-facing door lamp disposed on the car door, reference may be made to a technical solution in http://www.instructables.com/id/Preventive-lights-for-door-edge/ for implementation.

Still further, in a possible implementation, the sensor 12 may be disposed near all car lamps that may be on when the car door is opened. For example, when a different car door is opened, a different car lamp may be correspondingly on. A setting of this implementation can ensure that effective reminding can be implemented, regardless of which car door is opened.

In a possible implementation, the sensor 12 may be an existing electronic component such as a light sensor, an infrared temperature sensor, or an electromagnetic sensor, to detect whether the roof lamp 22 is on.

In a possible implementation, the sensor 12 and the mobile terminal 11 are connected in a wireless manner. The wireless manner may include a sound wave, infrared, Bluetooth, WIFI, or the like. Any communications standard or protocol may also be used, including but not limited to a GSM (Global System of Mobile communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), and the like.

Figure 2:
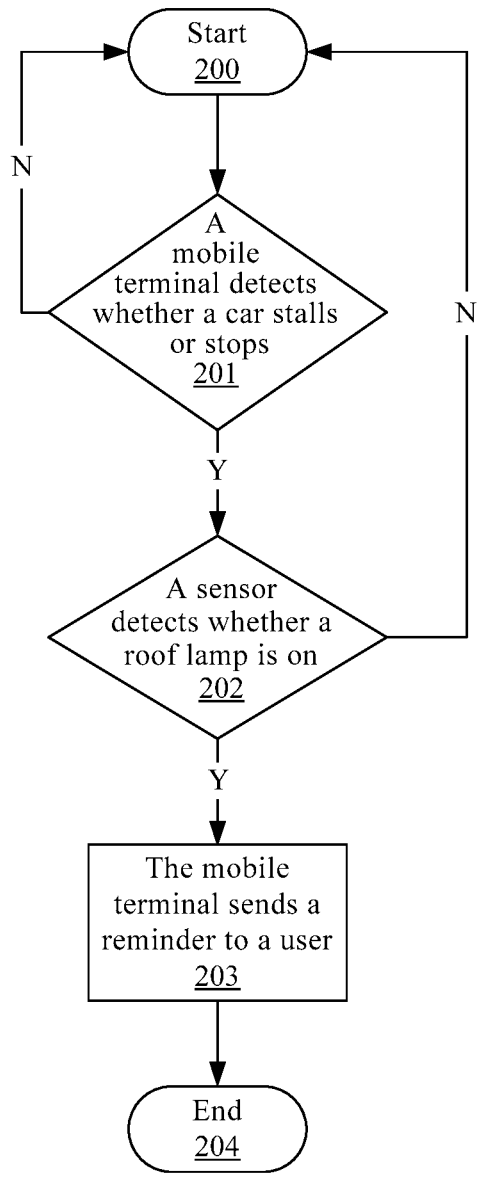
FIG. 2 is a flowchart of a reminding method according to a possible implementation of the present invention.

FIG. 2 is a flowchart of a reminding method according to a possible implementation of the present invention. As shown in FIG. 2, the method in this implementation includes the following steps.

Step 200: Start.

Step 201: A mobile terminal 11 detects whether a car stalls or stops. An expression that a car stalls used in this application is equivalent to that a car engine stalls.

In a possible implementation, the mobile terminal 11 has a motion sensor, for example, an acceleration sensor or a gyroscope, configured to detect whether the car stalls or stops. In an embodiment of the present invention, the existing mobile terminal 11 is used to detect a motion state of the car. This solves a problem that an existing huge quantity of cars are not equipped with an intelligent system, and also avoids a complicated modification process performed for the cars, thereby reducing costs.

Step 202: After detecting that the car stalls or stops, the mobile terminal 11 instructs a sensor 12 to detect whether a roof lamp 22 is on.

In a possible implementation, before being awakened by the mobile terminal 11, the sensor 12 maintains in a low-power standby state, to save energy and prolong a standby time. After being awakened by the mobile terminal 11, the sensor 12 detects a state of the roof lamp 22 and feeds back a result to the mobile terminal 11.

It is worth mentioning that, in an alternative implementation, the sensor 12 may keep detecting the state of the roof lamp 22, to improve detection accuracy.

Step 203: When the mobile terminal 11 receives a detection result that indicates the roof lamp 22 is on and that is sent by the sensor 12, the mobile terminal 11 sends a reminder to a user.

Step 204: End.

In this embodiment of the present invention, after it is detected that the car stalls or stops, it is further determined whether to send the reminder to the user with reference to the state of the roof lamp 22. This avoids misjudgment in some cases, to avoid causing trouble to the user. For example, when the user only occasionally opens the roof lamp 22 for lighting in a driving process, there is no need to start a reminder service.

In a possible implementation, the reminder sent by the mobile terminal 11 to the user includes a voice reminder and/or a light reminder, to attract the user's attention. For example, the mobile terminal 11 may generate a beep in a specific rhythm, or play music, or broadcast a voice prompt. The mobile terminal 11 may also light up an indicator, or make a flash blink, or light up a screen, or play predetermined content on the screen, to attract the user's attention, or directly send information to the user.

In a possible implementation, content of the reminder includes: reminding the user to pay attention to whether there is a pedestrian or an oncoming car behind when opening the door. A common traffic accident on a road is because a passenger in a car does not observe carefully before opening a door, causing the opened door to collide with a pedestrian or an oncoming car behind, or causing the pedestrian or the oncoming car to collide with another pedestrian or another vehicle on the road in order to avoid the opened door. Therefore, in this embodiment of the present invention, the reminder is generated when the car stalls or stops and when the door is to be opened. This can improve safety.

In a possible implementation, the content of the reminder includes: reminding the user to take away an item that should be carried and not to forget the item in the car. Forgetting belongings in the car not only causes inconvenience to the user's life, but also may cause a theft by a thief by smashing a window and cause damage to the car.

In a possible implementation, the content of the reminder may specifically point out which items should be carried, for example, remind the user to carry the mobile terminal 11.

Further, the mobile terminal has a maintainable item reminder list, and reminds the user in a visual or voice manner. For example, a list of items to be carried is displayed on a screen of the mobile terminal 11, or the items on the list are reported in turn by voice, so that the user can check whether all the items have been carried.

In a possible implementation, the mobile terminal 11 also has a positioning function, and determines the content of the reminder by using a positioning result. Positioning can be implemented in a manner such as base station positioning, GPS positioning, or inertial navigation positioning.

In a possible implementation, the mobile terminal 11 reminds the user of weather conditions in a current area according to the positioning result. For example, it may rain soon, and it is recommended to bring an umbrella. Alternatively, there may be a gale, and it is recommended to find a safe place to park the car. Alternatively, sunshine is strong, and the user is recommended to take a sun protection measure, and so on.

In another possible implementation, the mobile terminal 11 reminds the user of a security situation in the current area according to the positioning result, for example, informs the user of an incidence of theft or robbery cases in a nearby neighborhood, or a car theft rate, or the like, and reminds the user not to stay for a long time.

In still another possible implementation, the mobile terminal 11 reminds, according to the positioning result, the user of a nearby consumption place such as a restaurant or a cinema, or a nearby recreation place such as a museum or a stadium, for the user to choose.

The following is a specific example of an application of this embodiment of the present invention:

First, the motion sensor (the acceleration sensor or the gyroscope) on the mobile terminal 11 is used to collect motion data constantly and build a model. By means of model matching, a change of low-frequency vibration caused by the car engine and a change of the motion state of the car can be detected, and on this basis, a driving state of the car is determined. Once it is found, according to a data change, that the vibration disappears, it can be determined, according to the model, that the car has stalled or stopped. In this case, the light sensor 12 installed next to the roof lamp starts detection. At a moment when a driver opens the door, a driving computer of the car detects a car door open event by using a car door sensor and instantly lights up the roof lamp 22 (roof lamps of all vehicles have a door setting, and doors of all vehicles have a travel switch). In this case, the light sensor 12 next to the roof lamp 22 detects a change of light luminance, and sends an alarm signal to a mobile phone (the mobile terminal 12). The mobile phone instantly and quickly sends an alarm reminder signal that may be a voice prompt or may be a sound prompt, to remind the driver to carefully observe a situation behind the car before opening the door, thereby achieving a purpose of preventing a non-motor vehicle from colliding with the door.

Figure 3:
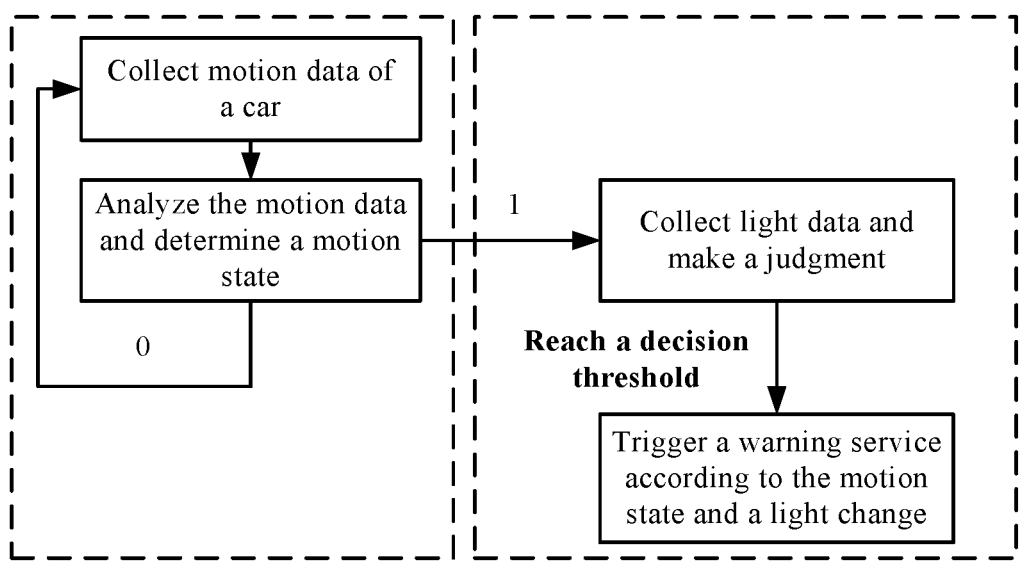
FIG. 3 is a flowchart of a reminding method according to another possible implementation of the present invention.

FIG. 3 is a flowchart of a reminding method according to another possible implementation of the present invention. As shown in FIG. 3, an embodiment of the present invention includes the following steps:

Step 1: Use a motion sensor that is on a mobile terminal 11 to collect data: The motion sensor on the mobile terminal 11 uninterruptedly collects motion data of a car.

Step 2: Perform analysis and modeling on the motion data of the car, and determine a driving state: Performing analysis on the motion data of the car collected by the motion sensor can detect a change of low-frequency vibration caused by a car engine and a change of a motion state of the car, and on this basis, a current driving state of the car is determined.

Step 3: After detecting that the car stalls or stops, the mobile terminal 11 starts a light sensor 12 to collect data and make a judgment: After detecting that the car stops, the mobile terminal 11 controls the roof light sensor 12 to start detection, where the light sensor 12 is a small-volume, low-cost, low-power component. The light sensor 12 disposed next to a roof lamp 22 starts to collect illumination data in a vicinity of the roof lamp 22 and makes the judgment. Once detecting that a change of a light value reaches a threshold, the light sensor 12 determines that a door is opened, and instantly sends an alarm signal to the mobile terminal 11.

Step 4: The mobile terminal 11 triggers a warning service according to a vehicle state and a light change: The mobile terminal 11 quickly sends an alarm reminder signal that may be a voice prompt or may be vibration or a light prompt, to remind a driver to carefully observe a situation behind the car before opening the door.

Figure 4:
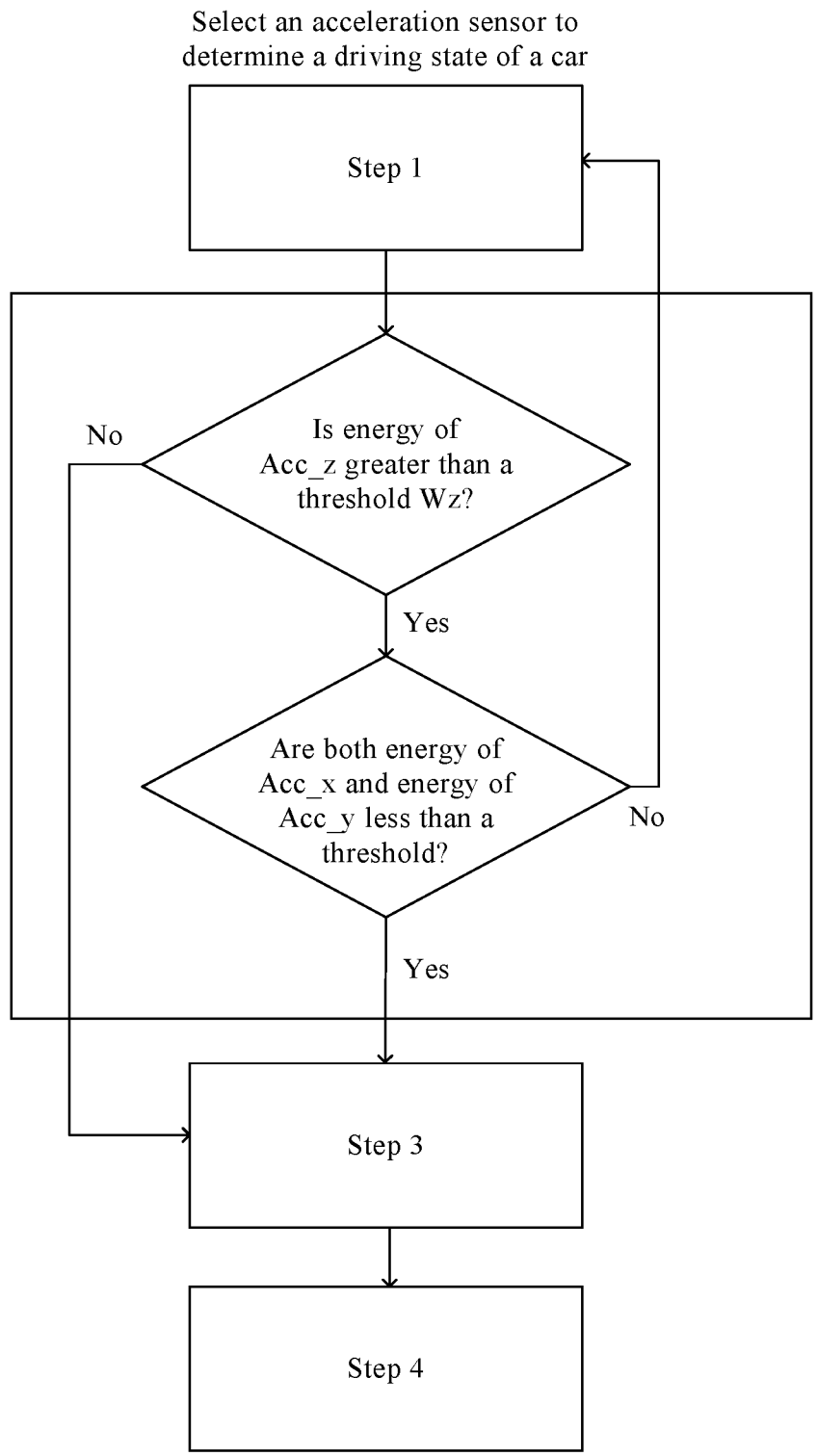
FIG. 4 is a flowchart of determining a driving state of a car according to a reminding method provided in a possible implementation of the present invention.

FIG. 4 is a flowchart of determining a driving state of a car according to a reminding method provided in a possible implementation of the present invention. As shown in FIG. 4, for an aspect in which this implementation is the same as the implementation shown in FIG. 3, details are not described. A mobile terminal 11 has an acceleration sensor, configured to collect motion data of the car, perform analysis and modeling on the motion data, and determine the driving state.

Analysis is performed on the collected motion data. By means of detection and judgment, a change of low-frequency vibration caused by a car engine and a change of a motion state of the car can be detected. An energy detection method is directly used for values Acc_x, Acc_y, and Acc_z of an x-axis, a y-axis, and a z-axis of the acceleration sensor, and the driving state of the car is determined as follows:

(1) A working state of the engine is determined according to whether energy of Acc_z in a unit time is greater than a threshold Wz. If the energy of Acc_z in the unit time is greater than the threshold, it is determined that the car engine is in the working state. If the energy of Acc_z in the unit time is less than the threshold, it is determined that the car engine is in a stopped state, that is, in a flameout state.

(2) The driving state of the car is determined according to whether energy of Acc_x or Acc_y in a unit time is greater than a threshold Wx or Wy. If one or more than one of acceleration energy of the x-axis and acceleration energy of the y-axis is greater than a threshold, it is determined the car is in the driving state; otherwise, it is determined that the car is in the stopped state.

(3) A state of the car is determined according to whether energy of Acc_x in a unit time, energy of Accy in a unit time, and energy of Acc_z in a unit time are respectively greater than the threshold Wx, the threshold Wy, and the threshold Wz. If the x-axis, the y-axis, and the z-axis are all less than a threshold, it is determined that the car is in a stopped and flameout state; otherwise, it is determined that the car is in a moving state or the engine is in the working state.

The z-axis is a direction axis perpendicular to a horizontal plane, and the x-axis and y-axis are direction axes of vehicle driving.

When the car is in the flameout or stopped state, or in the stopped and flameout state, the mobile terminal 11 may instruct a sensor 12 to detect a state of a roof lamp 22.

Figure 5:
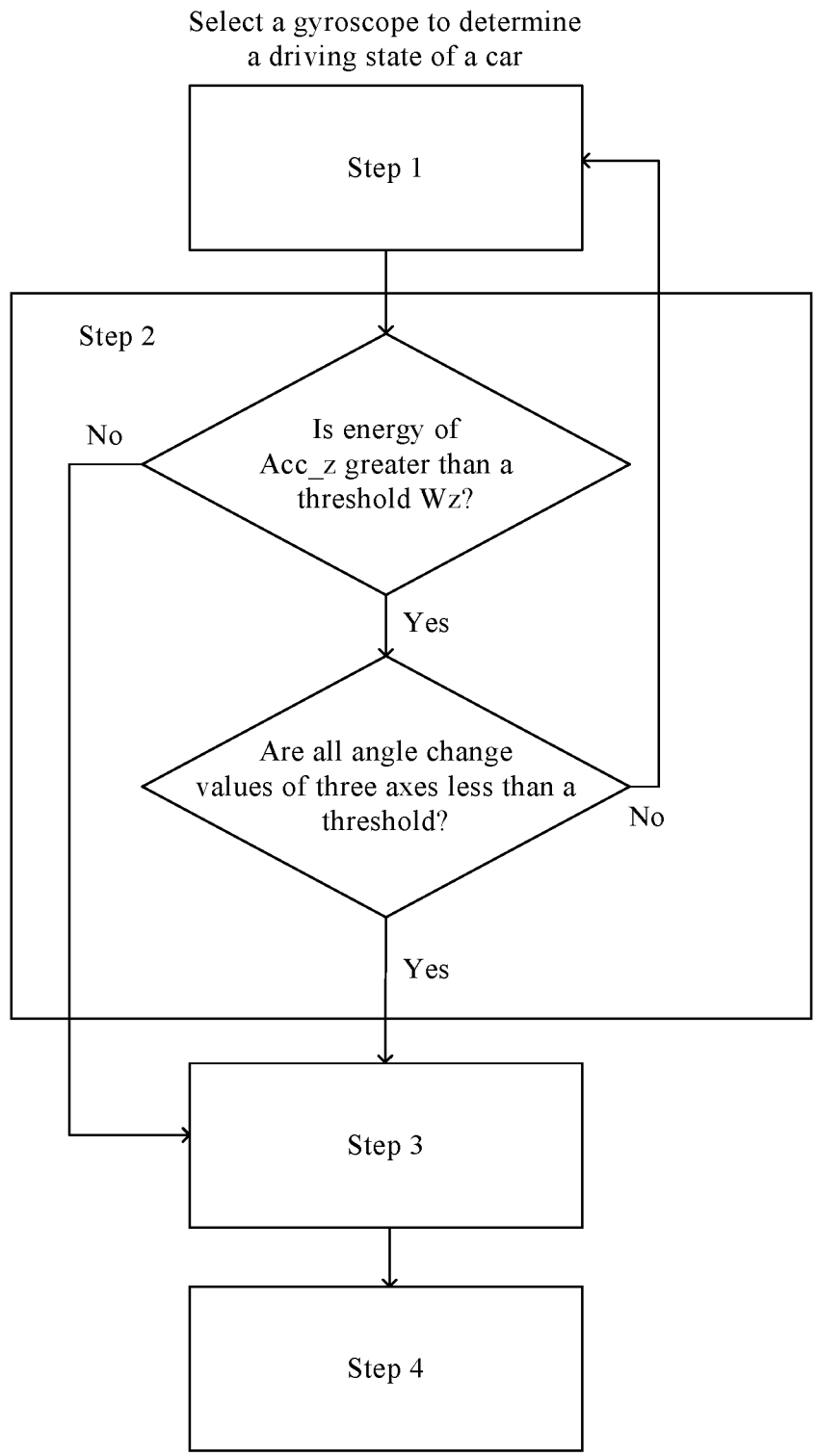
FIG. 5 is a flowchart of determining a driving state of a car according to a reminding method provided in another possible implementation of the present invention.

FIG. 5 is a flowchart of determining a driving state of a car according to a reminding method provided in another possible implementation of the present invention. As shown in FIG. 5, different from the implementation in FIG. 4, in this implementation, a mobile terminal 11 may determine a motion state of a car with reference to a gyroscope. When one of angle change values of three axes is greater than a threshold, it can be determined that the car is in a moving state.

Figure 6:
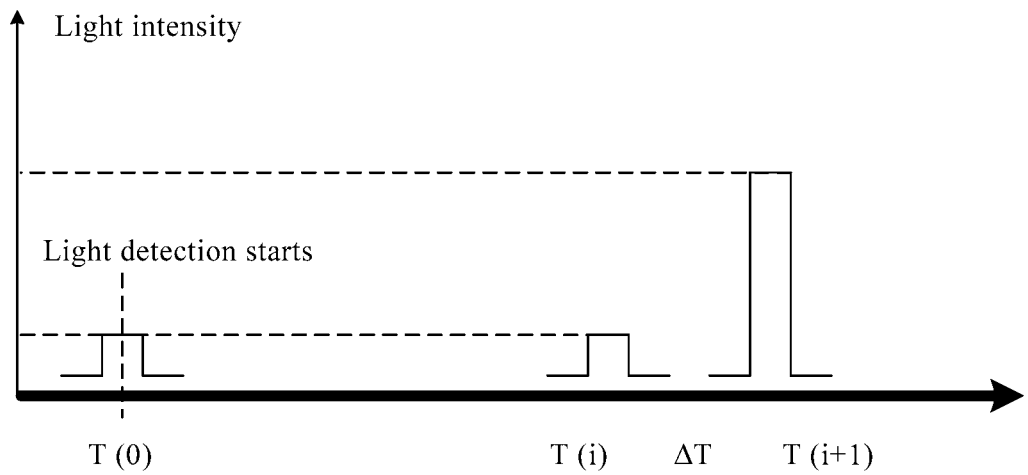
FIG. 6 is a schematic work diagram of a sensor according to a possible implementation of the present invention.

FIG. 6 is a schematic work diagram of a sensor 12 according to a possible implementation of the present invention. As shown in FIG. 6, in this implementation, the sensor 12 may be a light sensor. When detecting that a car stalls or stops, a mobile terminal 11 starts the light sensor 12 to collect data and make a judgment.

When detecting that the car is in a stopped state or that an engine is in a stopped state, the mobile terminal 11 sends an instruction to control the light sensor 12 disposed on a roof of the car to start detection. The light sensor 12 installed next to a roof lamp 22 starts to collect illumination data in a vicinity of the roof lamp and makes the judgment. The light sensor 12 may collect light in a pulse manner, that is, collect light intensity once every a period of time ΔT. Once detecting that a change ΔI of a light intensity value reaches a threshold, the light sensor 12 determines that the car door is opened, and instantly sends an alarm signal to the mobile terminal. A setting of the threshold uses the following formula as a case reference, but is not limited to this method:

$$\frac{i \times (I_{i+1} - I_i)}{\sum_i I_i - I_{i-1}} \geq N$$

A meaning of the formula is as follows: Find a difference between light intensity detected each time and light intensity detected a previous time, and average all differences. When it is detected that a light intensity change of the $(i+1)^{th}$ time is greater than N times an average value of the first i previous light intensity changes, the change of the light intensity value reaches the threshold.

Figure 7:
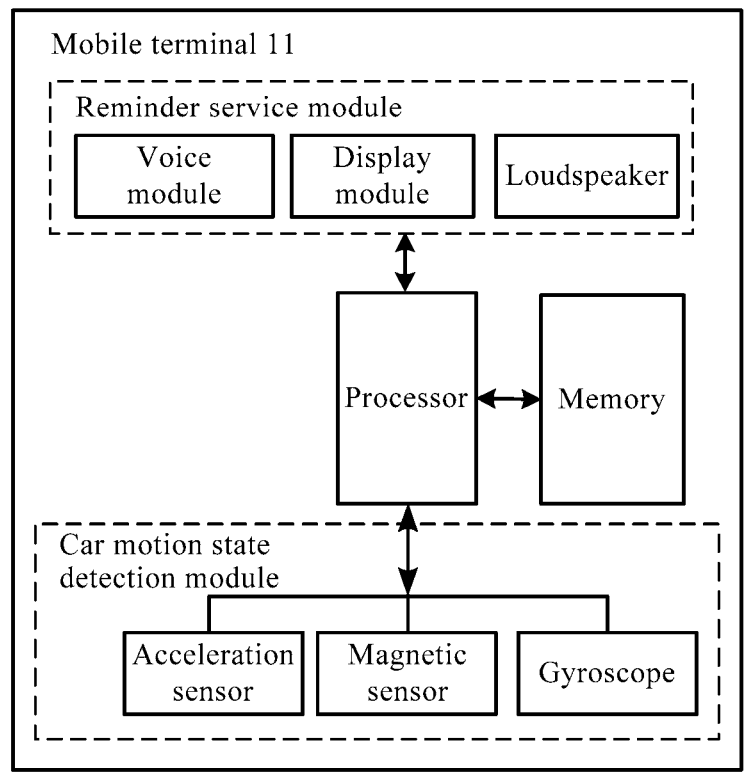
FIG. 7 is a structural diagram of a mobile terminal according to a possible implementation of the present invention.

FIG. 7 is a structural diagram of a mobile terminal 11 according to a possible implementation of the present invention. As shown in FIG. 7, the mobile terminal 11 includes a processor, a memory, a reminder service module, and a car motion state detection module. The reminder service module includes a voice module, a display module, and a loudspeaker. The car motion state detection module includes a motion sensor such as an acceleration sensor, a magnetic sensor, or a gyroscope.

Figure 8:
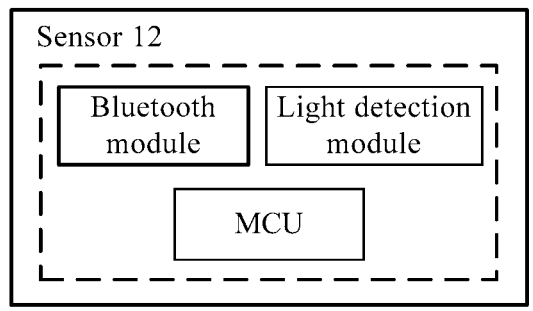
FIG. 8 is a structural diagram of a sensor according to a possible implementation of the present invention.

FIG. 8 is a structural diagram of a sensor 12 according to a possible implementation of the present invention. As shown in FIG. 8, the sensor 11 includes a light detection module, a Bluetooth module, and an MCU (Micro Control Unit, micro control unit).

A mobile terminal 11 according to an embodiment of the present invention may include a mobile phone, a wearable device (for example, a smart watch, a smart band, or the like), a tablet, a personal computer (PC, Personal Computer), a PDA (Personal Digital Assistant, personal digital assistant), or the like.

Figure 9:
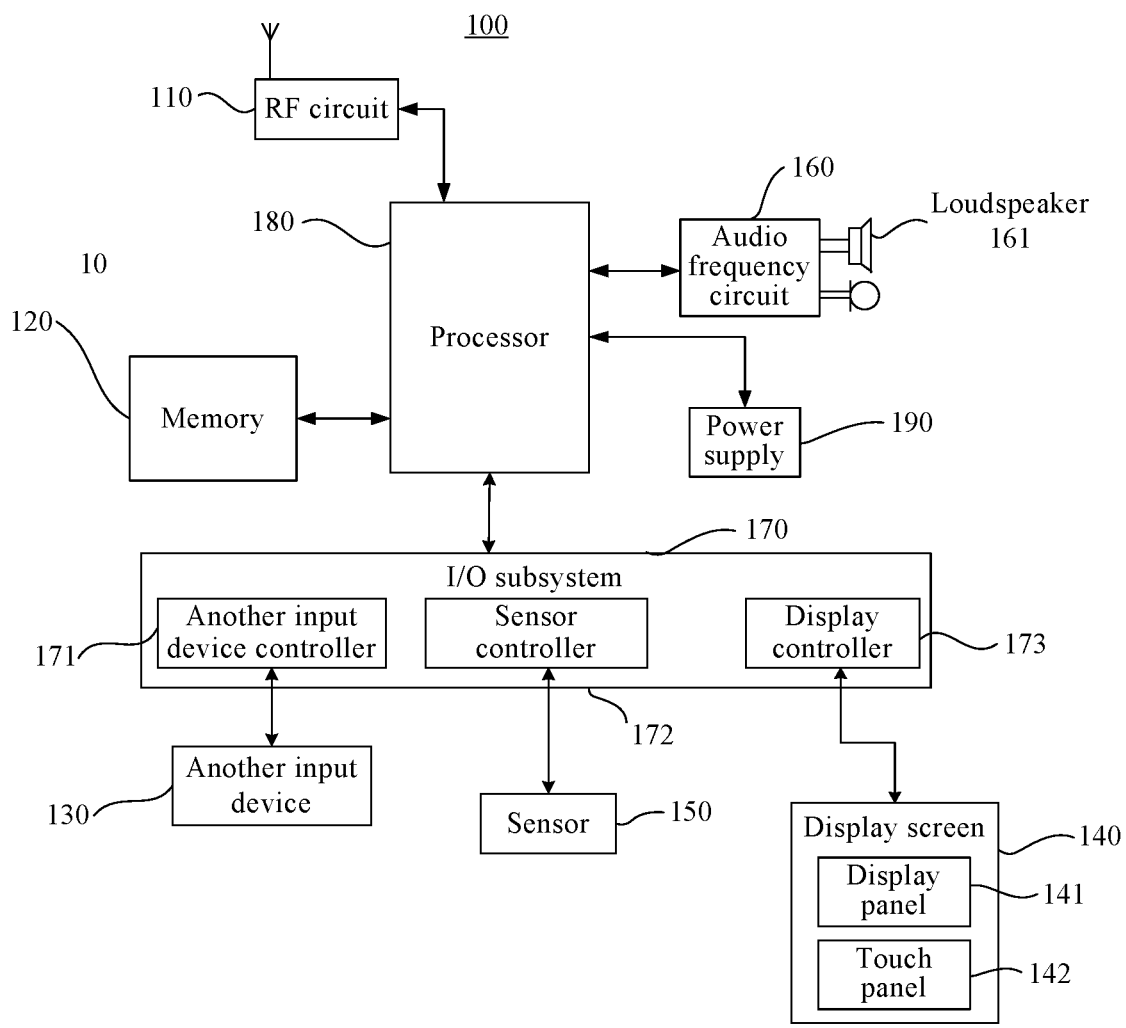
FIG. 9 is a block diagram of a partial structure of a mobile terminal according to a possible implementation of the present invention.

An example in which the mobile terminal 11 is a mobile phone is used. FIG. 9 shows a block diagram of a partial structure of a mobile phone 100 related to this embodiment of the present invention. Referring to FIG. 9, the mobile phone 100 includes components such as an RF (Radio Frequency, radio frequency) circuit 110, a memory 120, another input device 130, a display screen 140, a sensor 150, an audio frequency circuit 160, an I/O subsystem 170, a processor 180, and a power supply 190. A person skilled in the art may understand that the mobile phone structure shown in FIG. 9 does not constitute any limitation on the mobile phone. The mobile phone may include components more or fewer than those shown in the figure, or in the mobile phone, some components are combined, some components are split, or the components are disposed differently. A person skilled in the art may understand that the display screen 140 belongs to a user interface (UI, User Interface), and the mobile phone 100 may include user interfaces more or fewer than those shown in the figure.

The following describes each component of the mobile phone 100 in detail with reference to FIG. 9.

The RF circuit 110 may be configured to receive and send information, or receive and send a signal in a call process. In particular, the RF circuit 110 receives downlink information from a base station and sends the information to the processor 180 for processing, and sends uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may further communicate with a network and another device by means of wireless communication. Any communications standard or protocol may be used for the wireless communication, including but not limited to a GSM (Global System of Mobile Communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), and the like.

The memory 120 may be configured to store a software program and a module. The processor 180 runs the software program and the module that are stored in the memory 120, so as to execute various function applications of the mobile phone 100 and perform data processing. The memory 120 may mainly include a program storage area and a data storage area. The program storage area may store an operating system, an application program required by at least one function (such as an audio playback function and an image playback function), and the like. The data storage area may store data (such as audio frequency data and a phone book) that is created according to use of the mobile phone 100, and the like. In addition, the memory 120 may include a high-speed random access memory, and may further include a nonvolatile memory, for example, at least one disk storage device, a flash memory device, or another volatile solid-state storage device.

The another input device 130 may be configured to receive entered numeral or character information, and generate a key signal input related to a user setting and function control of the mobile phone 100. Specifically, the another input device 130 may include but is not limited to one or more of a physical keyboard, a function key (such as a volume control key or a switch key), a trackball, a mouse, a joystick, and an optical mouse (the optical mouse is a touch-sensitive surface that does not display a visual output, or an extension of a touch-sensitive surface formed by a touchscreen). The another input device 130 is connected to another input device controller 171 of the I/O subsystem 170, and performs signal interaction with the processor 180 under control of the another input device controller 171.

The display screen 140 may be configured to display information entered by a user or information provided for a user and various menus of the mobile phone 100, and may also receive a user input. Specifically, the display screen 140 may include a display panel 141 and a touch panel 142. The display panel 141 may be configured in styles such as an LCD (Liquid Crystal Display, liquid crystal display) and an OLED (Organic Light-Emitting Diode, organic light-emitting diode). The touch panel 142 is also referred to as a touchscreen, a touch-sensitive screen, or the like, and may collect a touch or non-touch operation (such as an operation performed by a user on the touch panel 142 or near the touch panel 142 by using a finger or any proper object or accessory such as a stylus, and may also include a motion sensing operation, where the operation includes an operation type such as a single-point control operation and a multi-point control operation) performed by the user on or near the touch panel 142, and drive a corresponding connecting apparatus according to a preset program. Optionally, the touch panel 142 may include two parts: a touch detection apparatus and a touch controller. The touch detection apparatus detects a touch azimuth and a posture of the user, detects a signal brought by a touch operation, and transmits the signal to the touch controller. The touch controller receives touch information from the touch detection apparatus, converts the touch information into information that can be processed by the processor, and sends the information to the processor 180, and can receive a command sent by the processor 180 and execute the command. In addition, the touch panel 142 may be implemented by using multiple types, such as a resistive type, a capacitive type, an infrared type, and a surface acoustic wave type, and the touch panel 142 may also be implemented by using any technology developed in the future. Further, the touch panel 142 may cover the display panel 141. The user may perform, according to content displayed by the display panel 141 (the displayed content includes but is not limited to a soft keyboard, a virtual mouse, a virtual key, an icon, and the like), an operation on or near the touch panel 142 that covers the display panel 141. When detecting a touch operation on or near the touch panel 142, the touch panel 142 transfers the touch operation to the processor 180 by using the I/O subsystem 170, to determine a type of a touch event to determine a user input. Then the processor 180 provides, by using the I/O subsystem 170, a corresponding visual output on the display panel 141 according to the type of the touch event and the user input. In FIG. 9, the touch panel 142 and the display panel 141 are used as two independent components to implement input and output functions of the mobile phone 100. However, in some embodiments, the touch panel 142 and the display panel 141 may be integrated to implement the input and output functions of the mobile phone 100.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 according to brightness of ambient light. The proximity sensor may turn off the display panel 141 and/or backlight when the mobile phone 100 moves to an ear. As a type of motion sensor, an accelerometer sensor may detect acceleration magnitudes in all directions (generally three axes), may detect a magnitude and a direction of gravity when the accelerometer sensor is stationary, and may be configured to recognize a posture application of the mobile phone (such as switching between a landscape mode and a portrait mode, related games, and magnetometer posture calibration), a vibration related function (such as a pedometer and stroke), and so on. As regards other sensors that may further be configured for the mobile phone 100, such as a gyroscope, a barometer, a hygrometer, a thermometer, and an infrared sensor, details are not described herein.

The audio frequency circuit 160, a loudspeaker 161, and a microphone 162 may provide an audio interface between the user and the mobile phone 100. The audio frequency circuit 160 may transmit, to the loudspeaker 161, a signal that is obtained after conversion of received audio frequency data, and the loudspeaker 161 converts the signal into a sound signal and outputs the sound signal. In another aspect, the microphone 162 converts a collected sound signal into a signal, the audio frequency circuit 160 receives and converts the signal into audio frequency data and outputs the audio frequency data to the RF circuit 108, and then the audio frequency data is sent to, for example, another mobile phone, or the audio frequency data is output to the memory 120 to perform further processing.

The I/O subsystem 170 is configured to control an input/output external device, and may include the another device input controller 171, a sensor controller 172, and a display controller 173. Optionally, one or more another input control device controllers 171 receive a signal from the another input device 130 and/or send a signal to the another input device 130. The another input device 130 may include a physical button (a push button, a rocker button, or the like), a dial, a slider switch, a joystick, a click scroll wheel, or an optical mouse (the optical mouse is a touch-sensitive surface that does not display a visual output, or an extension of a touch-sensitive surface formed by a touchscreen). It should be noted that the another input control device controller 171 may be connected to any one or more of the foregoing devices. The display controller 173 in the I/O subsystem 170 receives a signal from the display screen 140 and/or sends a signal to the display screen 140. After the display screen 140 detects a user input, the display controller 173 converts the detected user input into an interaction with a user interface object displayed on the display screen 140, that is, implements a man-machine interaction. The sensor controller 172 may receive a signal from one or more sensors 150 and/or send a signal to the one or more sensors 150.

The processor 180 is a control center of the mobile phone 100 and is connected to each part of the entire mobile phone by using various interfaces and lines, and performs, by running or executing the software program and/or module that is stored in the memory 120 and invoking data stored in the memory 120, various functions of the mobile phone 100 and data processing, so as to perform overall monitoring on the mobile phone. Optionally, the processor 180 may include one or more processing units. Preferably, an application processor and a modem processor may be integrated into the processor 180, where the application processor mainly processes an operating system, a user interface, an application program, and the like, and the modem processor mainly processes radio communication. It may be understood that the foregoing modem processor may not be integrated into the processor 180.

The mobile phone 100 further includes the power supply 190 (such as a battery) that supplies power to each component. Preferably, the power supply may be logically connected to the processor 180 by using a power supply management system, so that functions such as management of charging, discharging, and power consumption are implemented by using the power supply management system.

The mobile phone 100 may further include a camera, a Bluetooth module, and the like though they are not shown. Details are not described herein.

With descriptions of the foregoing implementations, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used in the present invention include a compact disc CD, a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
   obtaining, by a mobile terminal from a sensor, one or more first values comprising:
   Acc_x value comprising a value associated with an x-axis of the sensor
   Acc_y value comprising a value associated with an y-axis of the sensor; or
   Acc_z value comprising a value associated with an z-axis of the sensor;
   comparing at least one of the one or more first values to one or more thresholds;
   in response to the at least one of the one or more first values being less than the one or more thresholds, detecting, by the mobile terminal, that a car stalls or stops;
   receiving, by the mobile terminal, a signal indicating that a car lamp is on, and
   sending, by the mobile terminal, a reminder to a user.

2. The method according to claim 1, further comprising: after the mobile terminal detects that the car stalls or stops, instructing, by the mobile terminal, the sensor to detect whether the car lamp is on.

3. The method according to claim 1, wherein the mobile terminal communicates with the sensor via a wireless connection.

4. The method according to claim 1, wherein the reminder comprises:
an indication reminding the user to pay attention to whether there is a pedestrian; or
an indication of an oncoming car behind when opening the door.

5. The method according to claim 1, wherein the the reminder comprises: an indication reminding the user to take away an item.

6. The method according to claim 5, wherein the reminder comprises: an indication a name of the item.

7. The method according to claim 6, wherein the mobile terminal includes a maintainable item reminder list.

8. The method according to claim 1, further comprising determining, by mobile terminal, the reminder according to a positioning result of the mobile terminal, wherein the reminder comprises information related to the positioning result.

9. The method according to claim 8, wherein the reminder comprises an indication of at least one of weather conditions, a security situation, a consumption place, or a recreation place in a current area.

10. The method according to claim 1, further comprising receiving, by the mobile terminal from an acceleration sensor, the Acc_z value of the acceleration sensor on the z-axis;
detecting, by the mobile terminal, via a gyroscope, angle change values of three axes of the gyroscope;
in response to when the Acc_z value in a unit time is less than a threshold, determining, by the mobile terminal that the car stalls.

11. A system, comprising:
a sensor disposed near a car lamp of a car to detect whether the car lamp is on;
a sensor to detect one or more first values comprising:
Acc_x value comprising a value associated with an x-axis of the sensor
Acc_y value comprising a value associated with an y-axis of the sensor; or
Acc_z value comprising a value associated with an z-axis of the sensor;
a mobile terminal to:
receive, from the sensor, the one or more first values;
compare at least one of the one or more first values to one or more thresholds;
in response to the at least one of the one or more first values being less than the one or more thresholds, detect that a car stalls or stops
send a reminder to a user.

12. The system according to claim 11, wherein
in response to a detection that the car has stalled or stopped, the mobile terminal instructs the sensor to detect whether the car lamp is on.

13. The system according to claim 11, wherein the mobile terminal is connected to the sensor via in a wireless connection.

14. The system according to claim 11, wherein the sensor further:
collects light of the car lamp in a pulse manner;
collects light intensity once every a period of time $\Delta T$; and
in response to detecting that a change $\Delta I$ of a light intensity value reaches a threshold, determines that the car door is opened and sends the signal to the mobile terminal.

15. The system according to claim 11, wherein the reminder comprises at least one of:
an indication reminding the user to pay attention to whether there is a pedestrian or an oncoming car behind when opening the door;
an indication reminding the user to take away an item that should be carried; or
an indication a name of an item.

16. The system according to claim 11, wherein the mobile terminal determines the reminder according to a positioning result, and the reminder comprises information related to the positioning result.

17. The system according to claim 11, wherein the mobile terminal comprises a gyroscope;
the mobile terminal receives from an acceleration sensor, the Acc_z value of the acceleration sensor on the z-axis;
the mobile terminal, via the gyroscope, detects angle change values of three axes of the gyroscope;
in response to Acc_z value in a unit time is less than a threshold, determine that the car stalls.

18. A mobile terminal, comprising:
one or more processors; and
a computer readable storage medium storing programming for execution by the one or more processors, the programming including instructions to configure a receiving device to:
obtain, from a sensor, one or more first values comprising:
Acc_x value comprising a value associated with an x-axis of the sensor
Acc_y value comprising a value associated with an y-axis of the sensor; or
Acc_z value comprising a value associated with an z-axis of the sensor;
compare at least one of the one or more first values to one or more thresholds;
in response to the at least one of the one or more first values being less than the one or more thresholds, detect that a car stalls or stops;
receive, a signal indicating that a car lamp is on; and
send a reminder to a user.

* * * * *